United States Patent [19]
Selz

[11] Patent Number: 5,595,776
[45] Date of Patent: Jan. 21, 1997

[54] PROCESS FOR PREPARING EDGE-TO-EDGE ASSEMBLED BACON SLICES

[75] Inventor: Mark E. Selz, Sun Prairie, Wis.

[73] Assignee: Kraft Foods, Inc., Northfield, Ill.

[21] Appl. No.: 618,661

[22] Filed: Mar. 19, 1996

Related U.S. Application Data

[63] Continuation of Ser. No. 296,781, Aug. 26, 1994, abandoned.

[51] Int. Cl.⁶ ........................................................ A23L 1/31
[52] U.S. Cl. ........................ 426/272; 426/420; 426/513; 426/518; 426/641; 426/645
[58] Field of Search ............................ 426/92, 272, 420, 426/513, 517, 518, 641, 645

[56] References Cited

U.S. PATENT DOCUMENTS

| | | |
|---|---|---|
| 849,178 | 4/1907 | Walsh .................................. 426/513 X |
| 1,604,764 | 10/1926 | Block ...................................... 426/513 |
| 2,119,716 | 6/1938 | McKee .............................. 426/272 X |
| 2,388,823 | 11/1945 | Britt . | |
| 3,075,843 | 1/1963 | Maas et al. . | |
| 3,100,713 | 8/1963 | Grant . | |
| 3,370,960 | 2/1968 | Jaccard .............................. 426/513 X |
| 3,532,511 | 10/1970 | Binkerd et al. . | |
| 3,642,496 | 2/1972 | Gibson ..................................... 426/513 |
| 3,997,672 | 12/1976 | Stead et al. ............................ 426/645 |
| 4,107,337 | 8/1978 | Deppner, Jr. ............................ 426/266 |
| 4,124,339 | 11/1978 | Bernard ................................... 426/516 |
| 4,195,098 | 3/1980 | Otto ................................... 426/518 X |
| 4,210,677 | 7/1980 | Huffman .............................. 426/272 |
| 4,218,492 | 8/1980 | Stead et al. ........................... 426/646 |
| 4,258,066 | 3/1981 | Bernard ................................. 426/231 |
| 4,268,532 | 5/1981 | Bernard ................................. 426/231 |
| 4,378,379 | 3/1983 | Liesaus ................................. 426/272 |
| 4,446,159 | 5/1984 | Roth ..................................... 426/249 |
| 4,839,183 | 6/1989 | Perrine ................................. 426/274 |
| 4,917,911 | 4/1990 | Bush et al. .......................... 426/243 |

*Primary Examiner*—Arthur L. Corbin
*Attorney, Agent, or Firm*—Lockwood, Alex, Fitzgibbon & Cummings

[57] ABSTRACT

Assembled bacon slices are provided by assembling a plurality of bacon belly portions by a process that does not require the use of added binders or the use of spring-loaded forms or other compression-imparting devices. Heating followed by chilling effects belly portion assembly that holds during slicing and subsequent cooking. Pre-cooked generally square assembled bacon slices are thus provided.

14 Claims, 2 Drawing Sheets

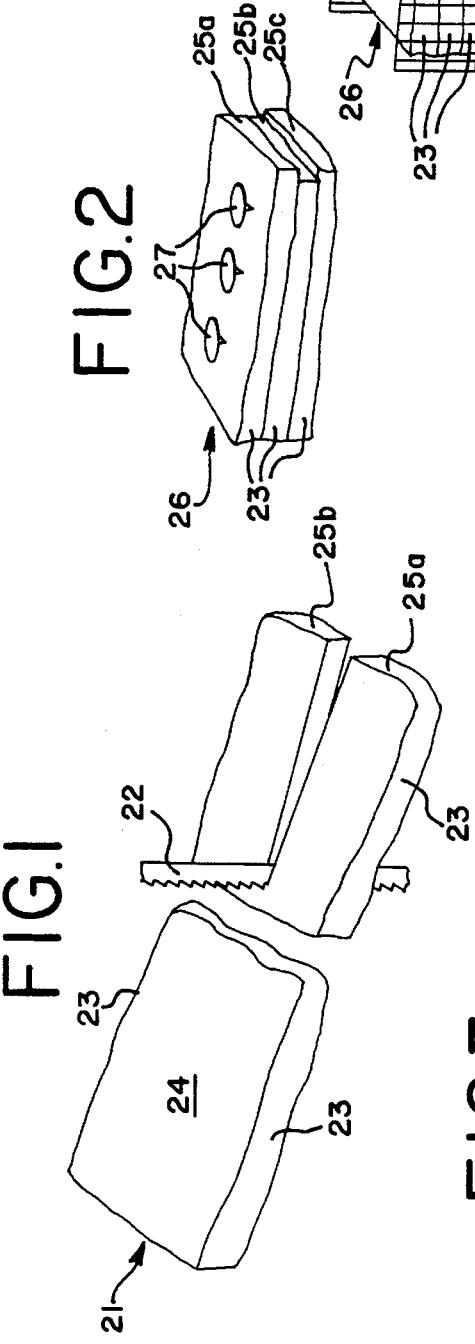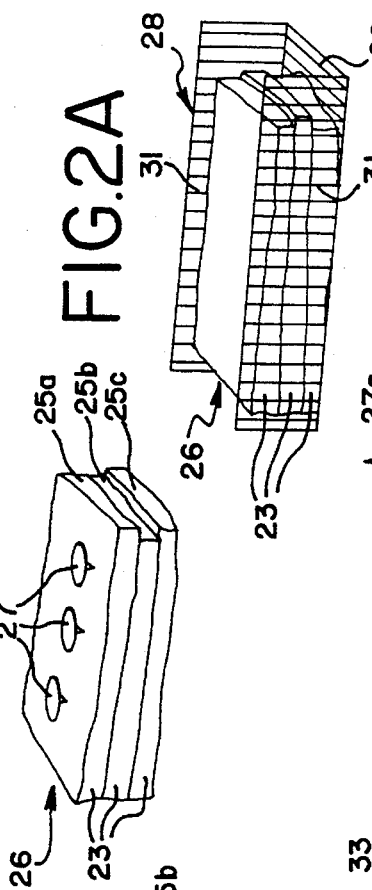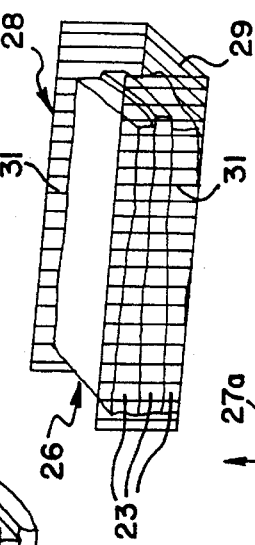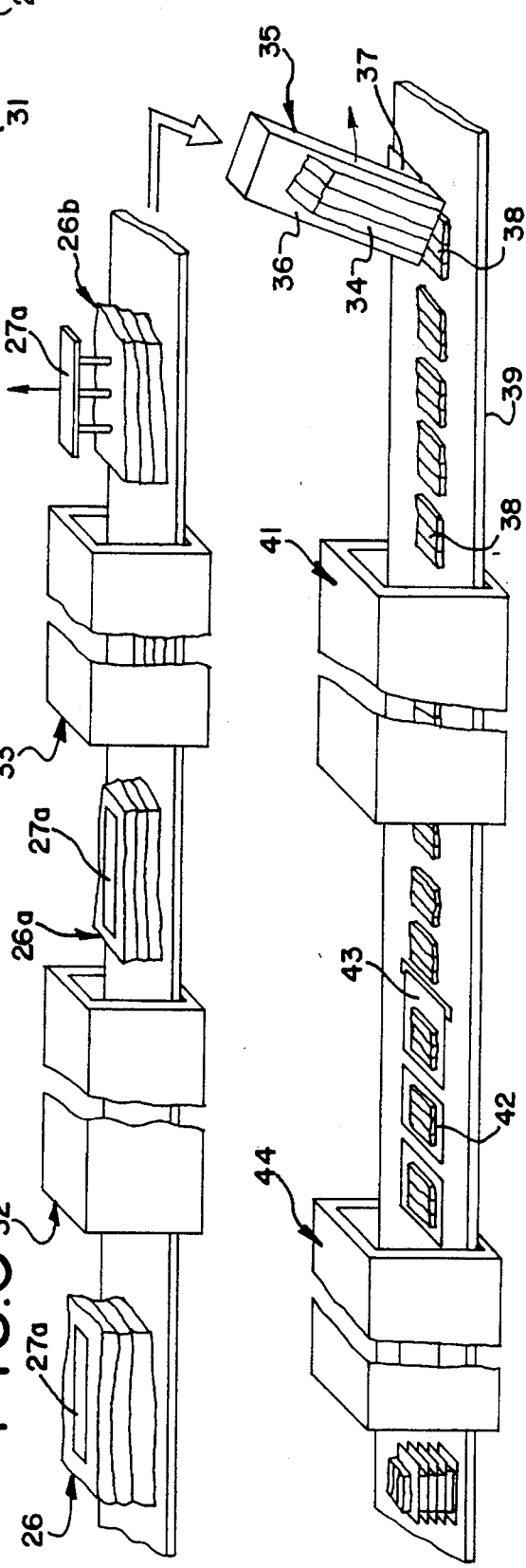

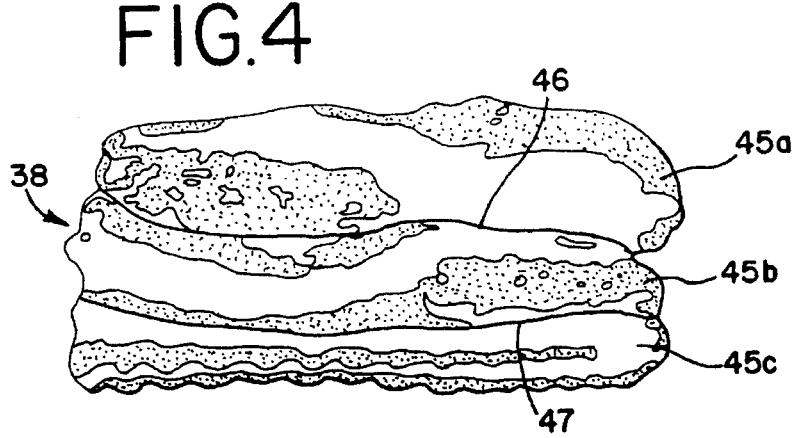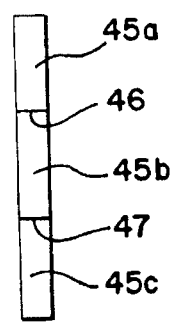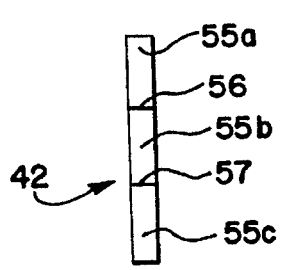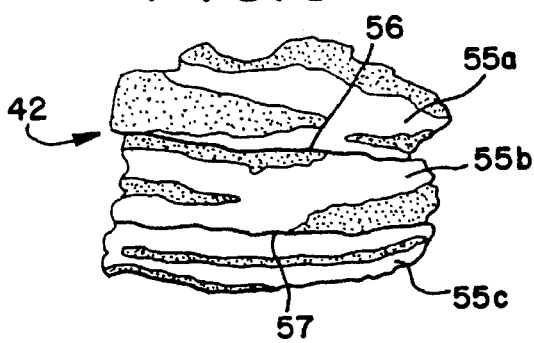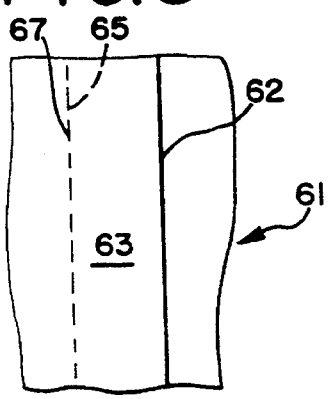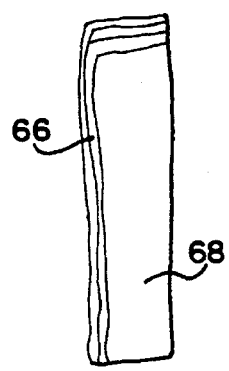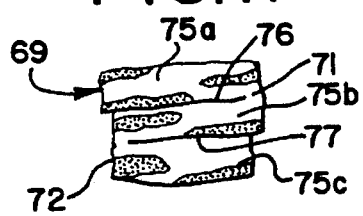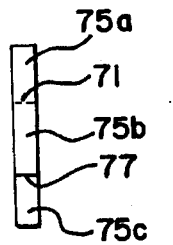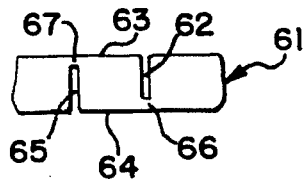

PROCESS FOR PREPARING EDGE-TO-EDGE ASSEMBLED BACON SLICES

This application is a continuation of application Ser. No. 08/296,781, filed Aug. 26, 1994, now abandoned.

BACKGROUND AND DESCRIPTION OF THE INVENTION

The present invention generally relates to assembled bacon slices and to processing by which they are made. More particularly, the invention relates to assembly features that result in bacon products which are made up of a plurality of slices or portions of slices that are joined together along respective longitudinal edges. As thus joined, the assembled slices are fully flush with one another and present themselves as a plurality of bacon slices or slice portions that lie side by side and in edge-to-edge relationship to one another. In an especially preferred embodiment, half-slice portions are thus joined together in order to provide a generally square-shaped assembled bacon slice that is especially suitable for use within food sandwiches.

In the food industry, it is often desired to provide food components in a ready-to-use form in order to save time and reduce the intensity of labor needed to prepare a finished food item or meal. This desire applies to the assembly of sandwich food items wherein reduced handling and increased uniformity of portion size and appearance are goals. At the same time, it is important to provide a finished food product such as a sandwich which avoids the appearance of using "processed" or "artificial" sandwich components. In industries such as the "fast food" restaurant business, there is often a desire to provide a finished product that has the appearance of having been carefully hand-prepared from customary sandwich "fixings" without actually requiring the investment of time and labor normally associated with such fixings.

Exemplary in this regard is the amount of time and attention which is needed when preparing sandwiches or other food products that incorporate bacon slices. When traditionally prepared, of course, bacon requires cooking, draining and handling of one piece of bacon at a time. In those instances where the bacon is to be placed upon a sandwich, a bacon slice is typically longer than desired, necessitating the further step of breaking the bacon in order to more closely coincide with sandwich sizing. Heretofore, approaches have been proposed whereby bacon is cooked by the industrial supplier and provided as a "precooked" bacon, thereby eliminating some of the time and labor required for cooking and draining of fat inasmuch as these steps are at least partially performed by the meat supplier.

Precooking of bacon slices does not always adequately reduce handling time and labor associated with having to size the bacon slices to fit the particular need. For example, many sandwiches are generally circular or square and have a diameter or length which is noticeably less than that of a typical slice of bacon. In these instances, further handling is required if it is desired to avoid excessive overlap of bacon outside of the sandwich. Additional handling time and labor is encountered by having to handle multiple slices of bacon because the typical sandwich would require two or more slices of bacon in order to provide a bacon layer throughout the sandwich. This latter concern has been addressed by bacon products which are generally round in overall shape. The objective of this type of an approach is to provide a bacon product that is suitable for use in sandwiches having round buns, such as "bacon burgers."

Round bacon products do not always enjoy wide consumer acceptance because these types of products give an overall impression of something that is somehow synthetic or processed. This concern has been addressed by U.S. Pat. No. 4,917,911, incorporated by reference hereinto. By the approach of this patent, a plurality of bacon strips are overlapped with each other and then cooked at the meat supplier, the cooking achieving a microwave "weld" at overlapping sections of the slices. These bacon assembly units may then be packaged by the meat processor, shipped, and removed from the package as a unit by the food preparer who then heats the bacon assembly unit and places it in the sandwich. The approach of this patent requires a specially designed assembly line in order to effect the overlapping of slices that is characteristic of the approach of this patent.

The present invention improves upon these various approaches and provides a completely natural and customarily processed bacon that includes multiple pieces assembled together in a manner which gives an appearance that is substantially the same as bacon strips which have been carefully hand-cooked, sized and placed on a sandwich or the like. The bacon assembly in accordance with the present invention retains the natural substantially rectangular appearance of bacon positioned within a sandwich while providing full surface coverage within the sandwich while avoiding overlapping assembly techniques and requirements that are characteristic of approaches such as those of U.S. Pat. No. 4,917,911.

In summary, the assembled bacon slices in accordance with the present invention are joined together along respective longitudinal edges in a manner which avoids slice overlap while still providing adequate assembly characteristics such that the food preparer need handle only a single food unit in order to have a supply of bacon that is properly sized for the sandwich or the like being prepared. The edge-to-edge assembled bacon slices are prepared by severing bacon bellies into portions, such as halves, and then stacking those portions one on top of the other. The stacked portions are then subjected to heating and chilling and, without requiring added binders or special pressure-exerting containers, the stacked belly portions are adhered together to a degree adequate to permit slicing of the multiple-layer belly assembly or log in a generally conventional fashion. The resulting slices are two or more partial bacon slices that are secured together by adjoining edges and without any slice overlapping. The resulting slices can be cooked and packaged as a pre-cooked product.

It is a general object of the present invention to provide a generally square bacon slice.

Another object of this invention is to provide an improved process for making a generally square bacon slice.

Another object of the present invention is to provide an improved pre-cooked generally square bacon slice and process for making same, such being characterized by an edge-to-edge assembly.

Another object of the present invention is to provide an improved bacon slice and process for making same without requiring added assembly compositions and/or pressure applying devices.

Another object of the present invention is to provide an improved generally square pre-cooked bacon product that avoids overlapping of slice components.

Another object of this invention is to provide an improved process and bacon product made thereby which can be carried out in existing bacon-making facilities and under typical bacon making conditions and procedures.

These and other objects, features and advantages of this invention will be clearly understood through a consideration of the following detailed description.

BRIEF DESCRIPTION OF THE DRAWINGS

The invention will be further elucidated in the following description with reference to the annexed Figures.

FIG. 1 is a generally schematic perspective view illustrating an initial lateral severance step of the preferred embodiment;

FIG. 2 illustrates a step subsequent to that of FIG. 1, the initial assembly of belly portions, this figure also illustrating a preferred arrangement for preventing movement of slab portions with respect to each other;

FIG. 2A shows an alternative arrangement for preventing movement of slab portions with respect to each other;

FIG. 3 is a generally schematic perspective illustration of the system in accordance with the present invention after initial assembly of the slab portions and through pre-cooking and packaging of the generally square bacon slices;

FIG. 4 is a plan view of a slice made in accordance with the embodiment of FIGS. 1 through 3;

FIG. 5 is an end or elevational view of the slice illustrated in FIG. 4;

FIG. 6 is a plan view of a slice along the lines of FIG. 4, except it is shown after the pre-cooking step;

FIG. 7 is an end or elevational view of the precooked slice shown in FIG. 6;

FIG. 8 is a plan view of a bacon belly during an initial step of an alternative end-to-end assembly process which utilizes a partial severance procedure;

FIG. 9 is an end or elevational view of the partially severed bacon belly shown in FIG. 8;

FIG. 10 is a perspective view of the partially severed belly illustrated in FIGS. 8 and 9 after Z-folding into a belly log that is generally square in cross-section;

FIG. 11 is a plan view of a bacon slice made from the belly of FIG. 10; and

FIG. 12 is an end or elevational view of the slice illustrated in FIG. 11.

DESCRIPTION OF THE PARTICULAR EMBODIMENTS

A bacon belly 21 which has been cured in accordance with customary practices in the bacon processing industry, is illustrated being severed generally into two halves by a suitable severance assembly such as vertical reciprocating blade 22. The severance is in a longitudinal direction generally midway between the opposite longitudinal edge faces 23. In this embodiment, severance is completely through the belly from the top face 24 of the belly through to the bottom face of the belly (not shown). The result is the formation of a plurality of belly portions or halves, generally designated as 25a and 25b.

For a typical belly, one of the faces has a greater fat content than the opposite face. For example, in FIG. 1, the top face 24 could be the so-called fat face, while the bottom face (not shown) would be the so-called lean face. In a next step of the process, these lean and fat faces are brought into contact with one another by stacking one belly portion on top of another belly portion. In the illustrated embodiment, a three-tier stack, generally designated as 26 in FIG. 2, is assembled. Here, belly portion 25a is stacked on top of belly portion 25b, and both are stacked upon a third belly portion 25c. If desired, whole bellies could be stacked in this general manner as well, without the need to sever into sections.

It has been found that a stacking arrangement whereby the fat faces and lean faces alternate with one another from top to bottom provides a finished generally square bacon slice that is most consistent in appearance with that of three partial slices of bacon positioned in edge-to-edge relationship to one another. As far as the assembly approach for the present invention is concerned, it is possible to have belly fat face engage belly fat face and have belly lean face engage belly lean face, but this has been found to result in finished bacon having an appearance somewhat different from unassembled slices. Thus, it is possible to have a stack such as shown in FIG. 2 in accordance with any of the following arrays, beginning with the top surface of the stack through to the bottom surface of the stack: lean-fat-lean-fat-lean-fat; fat-lean-lean-fat-fat-lean and fat-lean-lean-fat-lean-fat, for example.

The stack of FIG. 2 includes skewers 27. These are provided merely to prevent movement of the belly portions with respect to one another during subsequent processing stages. They do not need to exert any compressive forces on the belly portions. A single, multiple-prong skewer 27a is illustrated in FIG. 3.

An alternative arrangement for preventing relative movement of the belly portions is illustrated in FIG. 2A. A U-shaped basket 28 replaces the skewers 27, 27a, although it would be possible, but not necessary, to combine both the basket and one or more of the skewers. In this alternative embodiment, the bottom wall 29 of the basket supports the belly stack 26, while its longitudinally extending side walls 31 generally engage the various longitudinal edges 23 of the belly portions making up the belly stack.

Whatever device is used for preventing relative movement of the belly portions of the belly stack, same typically remains in place during the subsequent heating and chilling steps as discussed in more detail hereinafter. Because the processing in accordance with the present invention assembles the belly portions together to an extent that is adequate for slicing and subsequent slice processing of the belly log thus formed, these devices for preventing movement of belly portions of a belly stack are removed prior to slicing without concern for disassembly during slicing.

The system and process downstream of the belly stack formation is illustrated somewhat schematically in FIG. 3. A generally conveyorized system is illustrated. It is to be appreciated, however, that transfer of belly stacks or logs from station to station need not be fully automated, but could include operations such as movement of large racks containing belly stacks into and out of a smoking or heating room and into and out of a chilling compartment or room, for example.

In the illustrated system, a stream of belly stacks 26 are moved to a heating station 32. This station includes any one of a variety of conventional pieces of equipment that are used to heat conventional bacon bellies. Variations in conditions, such as time, temperature, and atmosphere including moisture levels, smoke levels, and the like, provide finished products having the desired flavor and appearance characteristics, such variations and conditions being generally known to those skilled in the art. Generally, it is required that substantially the entirety of the belly stack is cooked at this stage to reach a temperature above 126° F. A typical temperature range for this stage of the processing is between about 128° F. and about 140° F.

The heated belly stacks 26a are then transferred from the heating station 32 to a chilling station 33. The chilling station 33 brings the temperature of the belly stacks down to a conventional bacon belly slicing temperature. The precise means for effecting this temperature reduction throughout the entirety of the belly stacks can be any of a variety of assemblies or approaches known to those skilled in the art. Typically, this slicing temperature will range between about 19° F. and about 25° F. After chilling has been completed, an assembled belly stack or log 26b is formed and removed from the chilling station.

The skewers 27, 27a or other belly portion movement prevention devices are then removed from the belly stack 26b, as shown in FIG. 3. The result is a self-adhering belly log 34. Log or assembled stack 34 is ready for slicing within conventional bacon belly slicing equipment having a feeding assembly, blade access and blade size large enough to accommodate belly log or stack 34, which is substantially higher or thicker than conventional bacon bellies. It has been found that, provided the belly logs 34 are maintained at or near the slicing temperature, and are not otherwise subjected to rough handling which would break the adherence bond between opposing faces of the belly portions or halves 25a, 25b, 25c and so forth, the logs remain together during slicing. It has been found that, by stacking of the belly sections and then practicing only the heating and chilling steps as described herein, the belly portions adhere to form a bond between them which is sufficient to maintain the log or stack 34 together during slicing and sufficient to maintain a single generally square bacon slice together after the log is thus sliced and after the subsequent pre-cooking of the thus edge-to-edge assembled bacon slice.

With further reference to FIG. 3, each self-adhering belly stack or log 34 is fed into a slicer 35. Slicer 35 includes a canister 36 or other log holding mechanism or assembly. A feeding assembly (not shown) passes the stack or log to and through the slicing blade 37. The illustrated slicer is of a pendulum type well known in the art, such as slicers available from Grote Company. It will be appreciated that other slicers are suitable.

In the illustrated embodiment, each slice 38 thus formed is deposited onto a conveyor arrangement 39 in a laid-out manner. Preferably, the individual composite slices 38 do not engage one another and are directly conveyed to the next station.

The next station is a cooking station 41. It has been found that microwave energy is well-suited for the cooking station, although other cooking approaches are possible. Emerging from the cooking station is a stream of pre-cooked composite slices 42. Preferably, these are placed onto sheeting 43 in accordance with generally known procedures. Thereafter, the pre-cooked composite slices, preferably alternating with sheeting 43, are packaged into bags and/or boxes at a packaging station 44 in accordance with generally known principles.

An uncooked composite slice 38 is illustrated in FIGS. 4 and 5. Slice portions or halves 45a, 45b, 45c make up the composite slice 38. In the illustrated views, slice portions 45a and 45b are adhered together at location 46 which is along the combined longitudinal edges of slice portion 45a and slice portion 45b. Similarly, adherence location 47 joins the other longitudinal edge of slice 45b with an opposing longitudinal edge of slice portion 45c. It will be noted that this provides an edge-to-edge assembly, and any substantial overlapping of the respective slice portions is avoided. The slice portions 45a, 45b, 45c lie along and between the same two planes.

FIGS. 6 and 7 further illustrate the pre-cooked composite slice 42. It is very similar to composite slice 38, except it has been reduced in size by normal cooking shrinkage which is a well-known characteristic of bacon products. Each individual pre-cooked slice portion or half 55a, 55b, 55c and so forth remain adhered together at locations 56, 57 and so forth. Again, this adherence at these locations 56, 57 is an edge-to-edge assembly. The result is a uniquely appearing generally square bacon slice made up of bacon slice portions which remain joined together even after cooking.

In the illustrated embodiment, the generally square bacon slice is, and has the unique appearance of, three half slices of bacon joined together. Such a product is particularly applicable for sandwich topping use, such as in making so-called bacon burgers. Even when heated prior to assembly into a sandwich, these thus joined cooked slices provide sandwich coverage throughout the area of the sandwich and, in many cases, beyond the edge thereof so as to be visible to the consumer without opening the sandwich. In addition, such edge-to-edge joined partial slices are less likely to fall out of the sandwich when compared with single slices of bacon that are not otherwise joined. Also, the edge-to-edge assembled cooked slices in accordance with the present invention cover more area than overlapped slices when comparing equal quantities of equally cooked bacon meat.

Preferably, the pre-cooking accomplished at the cooking station 41 should be initiated before the composite slices 38 formed at the slicer 35 are raised substantially above the chilled slicing temperature. It has been found that the adherence achieved in accordance with the invention can be detrimentally affected if the composite slices are allowed to be raised substantially above the slicing temperature, such as above about 32° F., before the cooking is commenced, particularly if the composite slices 38 are subjected to movements tending to break the adherence at locations 46, 47. The preferred manner of achieving this desirable effect is to have the cooking station 41 located closely downstream of the slicer 35 so that the composite slices 38 will not require additional handling and will not have an opportunity to heat excessively to the extent that the adherence bonds at the locations 46, 47 could be broken.

When the three-tier stack or log 26 illustrated herein is made from belly halves as illustrated in FIG. 1, the log will have the following approximate dimensions for typically sized bacon bellies. The length is approximately 24 inches, the width is approximately 6 inches plus or minus 1 inch, and the depth or height is approximately 5 inches plus or minus 1 inch, this depth or height being the composite of the thicknesses of three bellies, each having a height of approximately 1 to approximately 2 inches. The resultant slices are, of course, approximately 5 inches (plus or minus 1 inch) by approximately 6 inches (plus or minus 1 inch). This is similar in sizing to three half slices of uncooked bacon laid edge-to-edge and unshingled. It will be appreciated that these sizes, particularly the height or depth sizes, will vary depending upon belly thickness or other belly dimensions. It is important to note that the resultant slices can be sliced to any desired conventional bacon slice thickness, for example, as thin as about 15 slices per inch. When cooked, the composite slices in accordance with this embodiment will have a length of approximately 3 inches plus or minus ½ inch and a width of approximately 3 inches plus or minus ½ inch.

The embodiment illustrated in FIGS. 8 through 12 could be generally expected to result in a substantially square cooked composite slice which would be typically smaller than the cooked composite slice (all other conditions being equal) made from the belly halves shown in FIG. 1. The composite slices of this alternative embodiment are made from a single belly which is partially severed and folded onto itself.

A partially severed bacon belly 61 is illustrated generally in FIG. 8 and FIG. 9. Suitable cutting means (not shown) partially sever the bacon belly longitudinally and preferably in two locations through respective opposite top and bottom faces of the belly dividing it at approximately ⅓ the belly width. More particularly, partial longitudinal severance 62 passes through top face 63 but not bottom face 64 of the belly. Similarly, partial longitudinal severance 65 passes through bottom face 64 but not top face 63. The formation of longitudinal webs 66, 67 is the result.

The thus partially severed slab is then folded on itself in a generally Z-folding manner to form the three-tiered stack or log 68 shown in FIG. 10. A slice 69 made therefrom is shown in FIG. 11 and FIG. 12. Slice 69 results after the heating, chilling and slicing operations as generally discussed hereinabove are performed on the three-tiered log 68. Folded integral web portion 71 assists in joining slice portions 75a and 75b together, such being in addition to the adherence 76 at the respective longitudinal edges of slice portions 75a and 75b. Similarly, folded integral web portion 72 assists the adherence location 77 in joining the slice portion 75b with the slice portion 75c.

For a typical bacon belly, the slice 69 formed in accordance with this embodiment has an uncooked size of approximately 4 inches plus or minus ½ inch by 5 inches plus or minus ½ inch. When cooked, such a slice can be somewhat small for use on a full-sized sandwich such as a bacon burger. This size can be particularly well-suited for breakfast sandwiches or sandwiches where a smaller sized generally square piece of bacon is desired or acceptable. Also, with the embodiment of FIGS. 8 through 12, belly faces having similar lean or fat properties will adjoin and adhere to one another. The pattern will be fat-lean-lean-fat-fat-lean. This is, of course, a function of the belly portions being folded over onto themselves.

It will be understood that the embodiments of the present invention which have been described are illustrative of some of the applications of the principles of the present invention. Various modifications may be made by those skilled in the art without departing from the true spirit and scope of the invention.

I claim:

1. A method for forming assembled bacon slices, comprising the steps of:

providing a bacon belly having generally parallel oppositely directed faces, one on a top side of the belly and the other on a bottom side of the belly;

forming at least one cut partially through the bacon belly to define an integral web portion along the belly and to form at least two bacon belly portions from each belly, each of said belly portions including a part of the top face and a part of the bottom face of said belly;

assembling one of said bacon belly portions onto another of said bacon belly portions by folding one of said bacon belly portions upon another of said bacon belly portions at said integral web portion such that the bacon belly portions engage one another along their respective face portions to provide a belly portion stack;

heating said belly portion stack until said bacon belly portions thereof adhere to one another to form an initially adhered stack;

chilling said initially adhered belly portion stack to less than or equal to about 32° F. to provide an adhered belly log; and thereafter slicing said adhered belly log into a plurality of assembled bacon slices in which a slice from one of said bacon belly portions is adhered in edge-to-edge relationship to a slice of another of said bacon belly portions.

2. The method in accordance with claim 1, wherein the assembled bacon slices do not overlap one another.

3. The method in accordance with claim 1, wherein the respective faces of the assembled slices of bacon do not engage one another.

4. The method in accordance with claim 1, wherein said adhered belly log is generally square in cross-section, and said assembled slices of bacon are generally square.

5. The method in accordance with claim 1, wherein said heating and chilling steps are carried out in the absence of added binder.

6. The method in accordance with claim 5, wherein said heating and chilling steps are carried out in the absence of applied compression pressure.

7. The method in accordance with claim 1, wherein said heating and chilling steps are carried out in the absence of applied compression pressure.

8. The method in accordance with claim 1, further including pre-cooking said assembled slices of bacon to provide pre-cooked assembled bacon slices.

9. The method in accordance with claim 8, wherein said slicing step includes laying out said assembled slices of bacon onto a conveying member in a non-shingled manner, followed by said pre-cooking step.

10. The method in accordance with claim 8, further including interleaving sheeting between the pre-cooked assembled bacon slices, and packaging same as alternating sheeting and pre-cooked assembled bacon slices.

11. The method in accordance with claim 1, wherein said heating step is carried out at a temperature greater than about 126° F.

12. The method in accordance with claim 1, wherein said heating step is carried out at a temperature between about 128° F. and about 140° F.

13. The method in accordance with claim 1, wherein said chilling step is carried out at a temperature of between about 19° F. and about 25° F.

14. The method in accordance with claim 1, wherein slicing step is carried out at a temperature not greater than about 32° F.

* * * * *